(12) United States Patent
Belleschi et al.

(10) Patent No.: US 12,150,211 B2
(45) Date of Patent: Nov. 19, 2024

(54) METHOD AND APPARATUS FOR PLATOON-BASED COMMUNICATIONS

(71) Applicant: Telefonaktiebolaget LM Ericsson (publ), Stockholm (SE)

(72) Inventors: Marco Belleschi, Solna (SE); Zhang Zhang, Beijing (CN); Congchi Zhang, Shanghai (CN); Liang Hu, San Diego, CA (US); Shehzad Ali Ashraf, Aachen (DE)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 171 days.

(21) Appl. No.: 17/424,276

(22) PCT Filed: Jan. 22, 2020

(86) PCT No.: PCT/CN2020/073854
§ 371 (c)(1),
(2) Date: Jul. 20, 2021

(87) PCT Pub. No.: WO2020/151751
PCT Pub. Date: Jul. 30, 2020

(65) Prior Publication Data
US 2022/0070972 A1     Mar. 3, 2022

(30) Foreign Application Priority Data
Jan. 24, 2019   (WO) ...................... PCT/2019/073047

(51) Int. Cl.
*H04W 84/20*   (2009.01)
*H04W 4/08*    (2009.01)
*H04W 4/46*    (2018.01)

(52) U.S. Cl.
CPC ............. *H04W 84/20* (2013.01); *H04W 4/08* (2013.01); *H04W 4/46* (2018.02)

(58) Field of Classification Search
CPC .......... H04W 4/08; H04W 4/46; H04W 84/20
See application file for complete search history.

(56) References Cited

U.S. PATENT DOCUMENTS

| 2018/0092067 A1 | 3/2018 | Liu et al. |
| 2018/0359619 A1* | 12/2018 | Ma .......................... H04W 4/44 |

(Continued)

FOREIGN PATENT DOCUMENTS

| CN | 102640459 A | 8/2012 |
| CN | 103782613 A | 5/2014 |

(Continued)

OTHER PUBLICATIONS

EPO Communication with Supplementary European Search Report dated Sep. 12, 2022 for Patent Application No. 20744774.9, consisting of 12-pages.

(Continued)

*Primary Examiner* — James P Duffy
(74) *Attorney, Agent, or Firm* — Weisberg I.P. Law, P.A.

(57) ABSTRACT

Various embodiments of the present disclosure provide a method for platoon-based communications. The method which may be performed by a first network node comprises determining, at a radio layer, a group header of a device group which comprises at least a terminal device. The group header comprises at least one of: an application layer group header being responsible for management of the device group at an application layer, and a radio layer group header being responsible for management of the device group at the radio layer. According to the embodiments of the present disclosure, a radio layer group header may be appointed for a device group so that communication management on the device group can be performed at the radio level.

9 Claims, 12 Drawing Sheets

(56) References Cited

U.S. PATENT DOCUMENTS

| | | | |
|---|---|---|---|
| 2019/0261260 A1* | 8/2019 | Dao | H04W 36/0033 |
| 2019/0364492 A1* | 11/2019 | Azizi | H04W 48/10 |
| 2020/0092685 A1* | 3/2020 | Fehrenbach | H04W 76/27 |
| 2020/0214052 A1* | 7/2020 | Van Phan | H04W 4/70 |
| 2021/0134159 A1* | 5/2021 | Cao | G08G 1/092 |

FOREIGN PATENT DOCUMENTS

| | | |
|---|---|---|
| CN | 105557034 A | 5/2016 |
| WO | 2018202798 A1 | 11/2018 |

OTHER PUBLICATIONS

3GPP TSG-RAN WG2 #104 R2-1817459; Title: AS-related group management for platooning; Agenda Item: 11.4.2.3; Source: Huawei, HiSilicon; Document for: Discussion and Decision; Date and Location: Nov. 12-16, 2018, Spokane, USA, consisting of 2-pages.
3GPP TSG-RAN WG2 #104 R2-1818496; Title: Report of [103bis#38] SL unicast/groupcast (LG); Agenda Item: 11.4.2.3; Source: LG (rapporteur); Document for: Discussion and Decision; Date and Location: Nov. 12-16, 2018, Spokane, USA, consisting of 20-pages.
VIVO, "Congestion control in NR V2X", 3GPP TSG-RAN WG2 Meeting #104, R2-1817114, Spokane, USA, Nov. 12-16, 2018, 1-3.

* cited by examiner

METHOD AND APPARATUS FOR PLATOON-BASED COMMUNICATIONS

FIELD OF THE INVENTION

The present disclosure generally relates to communication networks, and more specifically, to method and apparatus for platoon-based communications.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the evolution of wireless communication, a requirement for supporting device to device (D2D) communication features which targets at both commercial and public safety applications has been proposed. An extension for the D2D work may consist of supporting Vehicle-to-everything (V2X) communication, which includes any combination of direct communications among vehicles, pedestrians and infrastructure. Wireless communication networks such as long-term evolution (LTE) and new radio (NR) are expected to use V2X services and support communication for V2X capable user equipment (UE) with mobility. Thus, it is desirable to provide efficient management for the V2X communication.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In a wireless communication network such as LTE and NR, V2X services may be used for various applications to implement different communication requirements, for example, vehicles platooning, extended sensors, advanced driving, and remote driving. Some V2X capable UEs such as vehicle UEs may form a platoon within which vehicle status information may be shared. Among the vehicle UEs, a vehicle UE may be appointed as a platoon header which can determine the whole platoon direction and propagate essential information regarding road conditions as well as possible warnings/alerts to other members within the platoon. Currently, the platoon header is defined by application layer procedures and often corresponds to the vehicle UE which comes first in the platoon. Since there is no platoon entity defined at radio layers (or radio access network (RAN) layers) in the access stratum (AS), it is not possible to enforce at RAN layers certain protocols and procedures which in typical wireless cellular systems are performed at RAN layers. Therefore, it is needed to make the platoon entity visible at RAN layers.

Various exemplary embodiments of the present disclosure propose a solution for platoon-based communications, which may enable platoon header related information to be propagated to a RAN layer (or a radio layer), so as to handle the platoon header at the RAN/radio layer and perform management of platoon-based communications at RAN/radio level. It can be appreciated that the term "RAN layer" or "radio layer" as used herein also may be read as "RAN or radio layer" or "RAN/radio layer" or "radio/RAN layer" or "AS layer", and the term "RAN level" or "radio level" as used herein also may be read as "RAN or radio level" or "RAN/radio level" or "radio/RAN level" or "AS level".

According to a first aspect of the present disclosure, there is provided a method performed by a first network node such as a RAN node. The method comprises determining, at a radio layer (or a RAN layer), a group header of a device group which comprises at least a terminal device (such as a UE). The group header comprises at least one of: an application layer group header being responsible for management of the device group at an application layer, and a radio layer group header (or a RAN layer group header) being responsible for management of the device group at the radio layer (or the RAN layer).

In accordance with some exemplary embodiments, the determination of the group header of the device group may comprise: obtaining identification information of the application layer group header from at least one of a second network node and the terminal device of the device group; and determining the radio layer group header of the device group, based at least in part on the identification information of the application layer group header.

In accordance with some exemplary embodiments, the radio layer group header may be the same as the application layer group header. Alternatively, the radio layer group header may be different from the application layer group header.

In accordance with some exemplary embodiments, the determination of the group header of the device group may comprise: appointing the terminal device as the radio layer group header of the device group, according to one or more predefined appointment criteria.

In accordance with some exemplary embodiments, the appointment of the terminal device as the radio layer group header of the device group may be performed by the first network node, in response to a message from the terminal device triggered by one or more predefined events occurring at the terminal device.

In accordance with some exemplary embodiments, the message triggered by the one or more predefined events may indicate that the terminal device requests to become the radio layer group header.

In accordance with some exemplary embodiments, the message triggered by the one or more predefined events may indicate that the terminal device appoints itself as the radio layer group header.

In accordance with some exemplary embodiments, the occurrence of the one or more predefined events at the terminal device may trigger the terminal device to appoint itself as the radio layer group header.

In accordance with some exemplary embodiments, the message triggered by the one or more predefined events may be received by the first network node from the terminal device through an information element (IE) containing one or more parameters related to the device group.

In accordance with some exemplary embodiments, the method according to the first aspect of the present disclosure may further comprise: informing a second network node of at least part of the message triggered by the one or more predefined events; and issuing a response to the message triggered by the one or more predefined events.

In accordance with some exemplary embodiments, the method according to the first aspect of the present disclosure may further comprise: notifying identification information of the terminal device to other members of the device group, in response that the terminal device is appointed as the radio layer group header of the device group.

In accordance with some exemplary embodiments, the method according to the first aspect of the present disclosure may further comprise: transmitting update information about the device group to a second network node (such as a core network node).

In accordance with some exemplary embodiments, the method according to the first aspect of the present disclosure may further comprise: performing radio resource allocation for sidelink communications of the device group, based at least in part on information about the device group.

In accordance with some exemplary embodiments, the method according to the first aspect of the present disclosure may further comprise: providing allocation information about one or more radio resources for sidelink communications to a member of the device group via the radio layer group header.

In accordance with some exemplary embodiments, the method according to the first aspect of the present disclosure may further comprise: assigning a higher priority for communications with the group header of the device group than communications with other devices.

In accordance with some exemplary embodiments, the method according to the first aspect of the present disclosure may further comprise: participating at least partly in an admission control process for a candidate member of the device group via the radio layer group header.

According to a second aspect of the present disclosure, there is provided an apparatus which may be implemented as a first network node. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a first network node. The apparatus comprises a determining unit, and optionally a notifying unit and a providing unit. In accordance with some exemplary embodiments, the determining unit may be operable to carry out at least the determining step of the method according to the first aspect of the present disclosure. The notifying unit may be operable to carry out at least the notifying step of the method according to the first aspect of the present disclosure. The providing unit may be operable to carry out at least the providing step of the method according to the first aspect of the present disclosure.

According to a fifth aspect of the present disclosure, there is provided a method performed by a terminal device such as a UE. The method comprises determining whether the terminal device is to become a radio layer group header (or a RAN layer group header) of a device group. The device group comprises at least the terminal device. The radio layer group header is responsible for management of the device group at a radio layer (or a RAN layer).

In accordance with some exemplary embodiments, the method according to the fifth aspect of the present disclosure may further comprise: receiving, at the radio layer, indication information of an application layer group header of the device group from an application layer. The application layer group header may be responsible for management of the device group at the application layer.

In accordance with some exemplary embodiments, the determination of whether the terminal device is to become the radio layer group header of the device group may comprise: determining to appoint the terminal device itself as the radio layer group header of the device group, in response to occurrence of one or more predefined events at the terminal device.

In accordance with some exemplary embodiments, the determination of whether the terminal device is to become the radio layer group header of the device group may comprise: determining to request to become the radio layer group header of the device group, in response to occurrence of one or more predefined events at the terminal device.

In accordance with some exemplary embodiments, the method according to the fifth aspect of the present disclosure may further comprise: transmitting to a first network node a message triggered by the one or more predefined events.

In accordance with some exemplary embodiments, the message triggered by the one or more predefined events can enable the first network to determine the radio layer group header of the device group.

In accordance with some exemplary embodiments, the message triggered by the one or more predefined events may indicate that the terminal device appoints itself as the radio layer group header of the device group, or that the terminal device requests to become the radio layer group header of the device group.

In accordance with some exemplary embodiments, the message triggered by the one or more predefined events may comprise at least one of a group information report and a group header request from the terminal device.

In accordance with some exemplary embodiments, the message triggered by the one or more predefined events may be transmitted to the first network node through an information element (IE) containing one or more parameters related to the device group.

In accordance with some exemplary embodiments, the method according to the fifth aspect of the present disclosure may further comprise: receiving from the first network node a response to the message triggered by the one or more predefined events.

In accordance with some exemplary embodiments, the method according to the fifth aspect of the present disclosure may further comprise: receiving, from the first network node, allocation information about one or more radio resources for sidelink communications of a member of the device group; and forwarding the allocation information to the member of the device group.

In accordance with some exemplary embodiments, the method according to the fifth aspect of the present disclosure may further comprise: performing an admission control process for a candidate member of the device group, according to one or more admission control criteria.

In accordance with some exemplary embodiments, the method according to the fifth aspect of the present disclosure may further comprise: removing a member of the device group from the device group, according to one or more removal criteria.

In accordance with some exemplary embodiments, the method according to the fifth aspect of the present disclosure may further comprise: using groupcast communications to signal, within the device group, a change of the device group.

In accordance with some exemplary embodiments, the method according to the fifth aspect of the present disclosure may further comprise: indicating, in sidelink control information (SCI), that the terminal device is the radio layer group header of the device group.

In accordance with some exemplary embodiments, the method according to the fifth aspect of the present disclosure may further comprise: performing management of sidelink communications of the device group.

In accordance with some exemplary embodiments, the method according to the fifth aspect of the present disclosure may further comprise: staying in a connected mode according to one or more predefined status criteria.

In accordance with some exemplary embodiments, the message triggered by the one or more predefined events may enable the terminal device to enter a connected mode from an idle mode.

In accordance with some exemplary embodiments, the terminal device may be in a connected mode during the terminal device being appointed as the group header (such as the radio layer group header and/or the application layer group header) of the device group.

In accordance with some exemplary embodiments, the method according to the fifth aspect of the present disclosure may further comprise: obtaining identification information of the radio layer group header of the device group from at least one of the radio layer group header and the first network node, in response to determining that the terminal device is not to become the radio layer group header of the device group.

In accordance with some exemplary embodiments, the method according to the fifth aspect of the present disclosure may further comprise: receiving configuration information about sidelink communications of the terminal device from the radio layer group header; and performing the sidelink communications of the terminal device, based at least in part on the received configuration information.

In accordance with some exemplary embodiments, the method according to the fifth aspect of the present disclosure may further comprise: transmitting a group admission request to another radio layer group header of another device group to join the another device group; and receiving, from the another radio layer group header, a response to the group admission request to indicate whether the terminal device is admitted to join the another device group.

In accordance with some exemplary embodiments, the method according to the fifth aspect of the present disclosure may further comprise: performing an admission control process to join another device group, based at least in part on local information of the terminal device.

According to a sixth aspect of the present disclosure, there is provided an apparatus which may be implemented as a terminal device. The apparatus comprises one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a terminal device. The apparatus comprises a determining unit, and optionally a transmitting unit and a receiving unit. In accordance with some exemplary embodiments, the determining unit may be operable to carry out at least the determining step of the method according to the fifth aspect of the present disclosure. The transmitting unit may be operable to carry out at least the transmitting step of the method according to the fifth aspect of the present disclosure. The receiving unit may be operable to carry out at least the receiving step of the method according to the fifth aspect of the present disclosure.

According to a ninth aspect of the present disclosure, there is provided a method performed by a second network node such as a core network node. The method comprises providing identification information of an application layer group header of a device group to a first network node such as a RAN node. The first network node is capable of determining a radio layer group header (or a RAN layer group header) of the device group. The application layer group header is responsible for management of the device group at an application layer, and the radio layer group header is responsible for management of the device group at a radio layer (or a RAN layer).

In accordance with some exemplary embodiments, the method according to the ninth aspect of the present disclosure may further comprise: receiving a message from the first network node to indicate information about the radio layer group header of the device group; and transmitting a response to the message to the first network node.

In accordance with some exemplary embodiments, the method according to the ninth aspect of the present disclosure may further comprise: receiving update information about the device group from the first network node.

In accordance with some exemplary embodiments, the update information may indicate a change of the radio layer group header of the device group.

According to a tenth aspect of the present disclosure, there is provided an apparatus which may be implemented as a second network node. The apparatus may comprise one or more processors and one or more memories comprising computer program codes. The one or more memories and the computer program codes may be configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus which may be implemented as a second network node. The apparatus comprises a providing unit, and optionally a receiving unit and a transmitting unit. In accordance with some exemplary embodiments, the providing unit may be operable to carry out at least the providing step of the method according to the ninth aspect of the present disclosure. The receiving unit may be operable to carry out at least the receiving step of the method according to the ninth aspect of the present disclosure. The transmitting unit may be operable to carry out at least the transmitting step of the method according to the ninth aspect of the present disclosure.

According to a thirteenth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the first aspect of the present disclosure.

According to a fourteenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the first aspect of the present disclosure.

According to a fifteenth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the fifth aspect of the present disclosure.

According to a sixteenth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the fifth aspect of the present disclosure.

According to a seventeenth aspect of the present disclosure, there is provided a method implemented in a communication system which may include a host computer, a base station and a UE. The method may comprise, at the host computer, receiving user data transmitted to the base station from the UE which may perform any step of the method according to the fifth aspect of the present disclosure.

According to an eighteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the fifth aspect of the present disclosure.

According to a nineteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the first aspect of the present disclosure.

According to a twenty aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the first aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
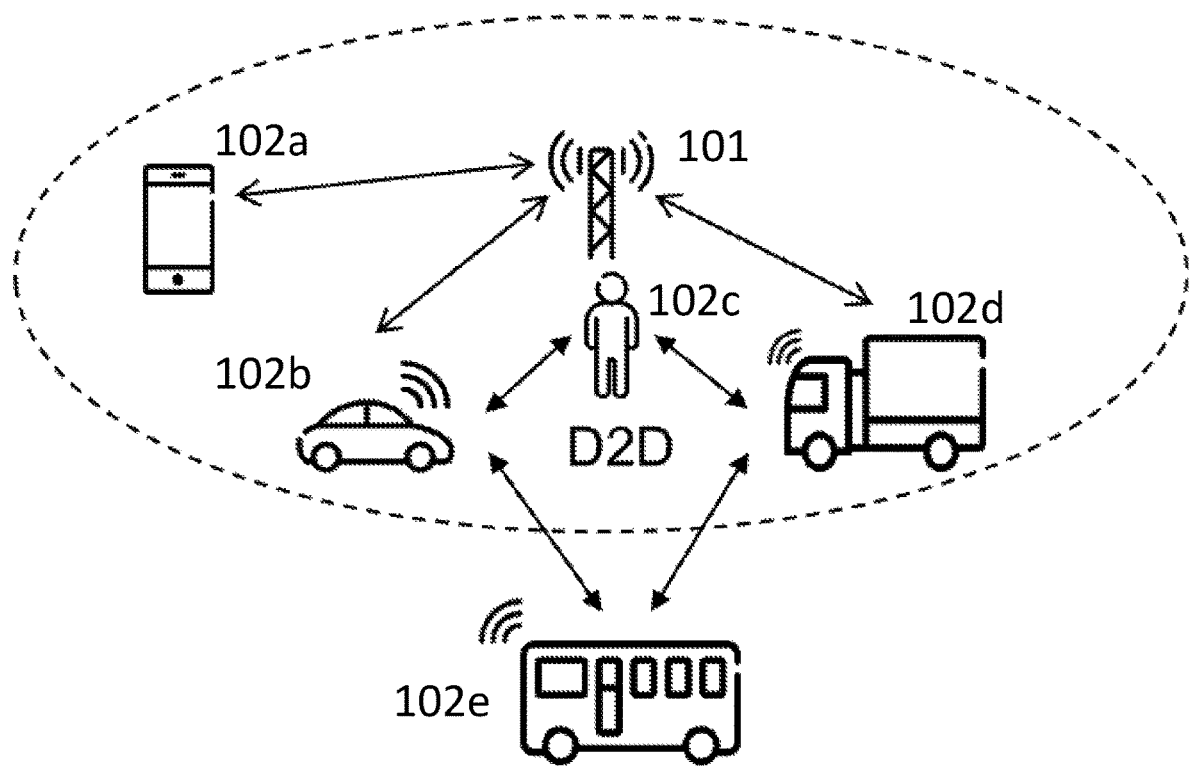
FIG. 1 is a diagram illustrating exemplary V2X scenarios for an LTE-based or NR-based network (NW) according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. To meet dramatically increasing network requirements on traffic capacity and data rates, one interesting option for communication technique development is to allow V2X communications to be implemented in a wireless communication network such as 4G/LTE or 5G/NR network. V2X communications may carry both non-safety and safety information, where each of the applications and services related to V2X communications may be associated with specific requirements sets, e.g., in terms of latency, reliability, data rates, etc.

V2X communications may take advantage of a network (NW) infrastructure, when available, but at least basic V2X connectivity needs to be possible even in case of lack of coverage. Many use cases may be defined for V2X communications, for example, vehicle-to-vehicle (V2V) communication, vehicle-to-pedestrian (V2P) communication, and vehicle-to-infrastructure/network (V2I/N) communication. Providing a 3GPP V2X interface may be economically advantageous because of the 3GPP economies of scale and it may enable tighter integration between communications with the NW infrastructure (V2I), pedestrian (V2P) and other vehicles (V2V), as compared to using a dedicated V2X technology. Direct unicast (i.e. one-to-one) and/or multicast (i.e. one-to-many) transmissions over sidelink may be needed in some use cases such as platooning, cooperative driving, dynamic ride sharing, etc. Some advanced applications of V2X communications may have more stringent requirements on the needed data rate, capacity, reliability, latency, communication range and speed.

In accordance with some exemplary embodiments, the V2V communication may cover any 3GPP standard technology such as LTE-based or NR-based communication between vehicles, for example, via Uu or sidelink (PC5) interface. Specifically, the V2P communication may cover LTE-based or NR-based communication between a vehicle and a device carried by an individual (e.g. handheld terminal carried by a pedestrian, cyclist, driver or passenger), for example, via Uu or sidelink (PC5) interface. The V2I/N communication may cover LTE-based or NR-based communication between a vehicle and a roadside unit/network. A roadside unit (RSU) may be a transportation infrastructure entity (e.g. an entity transmitting speed notifications) that communicates with V2X capable UEs over sidelink (PC5) interface. For V2N, the communication may be performed on Uu interface.

FIG. 1 is a diagram illustrating exemplary V2X scenarios for an LTE-based or NR-based network (NW) according to an embodiment of the present disclosure. Various embodiments of the present disclosure are described without limitation in the context of a communication system as illustrated in the diagram of FIG. 1. The communication system may include UEs that are configured for D2D, V2X, and/or other sidelink communications in accordance with various embodiments of the present disclosure. As shown in FIG. 1, the communication system can include a network node 101 (e.g., an eNB/gNB), and a plurality of UEs 102a-102e. The UEs 102a-102e can be any type of electronic device or wireless communication device configured for D2D and/or V2X communications such as V2I, V2P, V2V communications or any combination thereof. As used herein, D2D is referred to in a broader sense to include communications between any type of UEs, and includes V2X communications between a vehicle UE and any other type of UE. D2D and/or V2X may be a component of many existing wireless technologies when it comes to direct communication between wireless devices. D2D and/or V2X communications as an underlay to cellular networks may be proposed as an approach to take advantage of the proximity of devices.

Although various embodiments are explained in the context of V2X communications, some embodiments can also be used for other types of direct communications, including D2D and other sidelink communications, etc. Accordingly, the term "V2X" herein can be replaced with the term "D2D" for some exemplary embodiments. Moreover, throughout the disclosure, although some embodiments are described in the context of LTE evolution, they may be used in other wireless systems, including systems that operate according to 5G standards, also referred to as NR, or future radio technologies and standards.

In an LTE network, there may be two different resource allocation (RA) procedures for V2X communications on sidelink, i.e. centralized RA (so called "mode 3") and distributed RA (so called "mode 4"). Transmission resources for the V2X communications on sidelink may be selected within a resource pool which is predefined or configured by the network (NW).

According to an exemplary embodiment where the centralized or NW-scheduled RA (i.e. mode-3) is applied, the transmission sidelink radio resources are dynamically scheduled or allocated by the NW. Similar to Uu scheduling, a UE can request radio resources for transmissions to the NW using uplink signaling (e.g., scheduling request (SR), sidelink-buffer status report (SL-BSR), etc.). As a response, the NW may grant radio resources via physical downlink control channel (PDCCH) for sidelink transmissions to the UE. Depending on network decision, the grant provided by the NW may be valid for the transmission of a single transport block (TB), including its retransmission, or for the transmission of multiple TBs over multiple periodic resources as for the semi-persistent scheduling (SPS) grant.

According to an exemplary embodiment where the distributed or autonomous RA (i.e. mode-4) is applied, it is intended to use a resource allocation scheme in which the NW provides a set of radio resources in broadcast fashion to be used on a certain carrier. Such radio resources are then contended by UEs interested in sidelink operations, according to certain rules. In particular, a UE before using certain resources needs to sense such resources for some time. The UE can select the resources for sidelink transmissions in case of these resources being deemed to be free. Sensing may be based on decoding of sidelink control information (SCI) and reference signal received power (RSRP) measurement of physical sidelink shared channel (PSSCH) from surrounding UEs. To enable such sensing-based resource allocation, no UE specific scrambling is adopted, which implies on sidelink a UE cannot be recognized in layer-1 (L1).

In accordance with some exemplary embodiments, depending on the specific service to be transmitted, the UE may either reserve the radio resources for multiple transmissions according to a desired pattern (which repeats periodically in the time domain), or the UE can simply select the radio resources for a single "one-shot" transmission.

In NR networks, many use cases for advanced V2X services may be supported with new service requirements. For example, these use cases may be categorized into four applications: vehicles platooning, extended sensors, advanced driving, and remote driving. For these advanced applications, the expected requirements to meet the needed data rate, capacity, reliability, latency, communication range and speed are made more stringent.

While the NR resource allocation framework is expected to roughly take the LTE V2X framework as baseline, some fundamental enhancements may be needed to fulfill the NR requirements. For example, in order to meet these requirements, some improvements need to be introduced in layer-1 (L1) and layer-2 (L2) access stratum (AS) protocols, so as to enforce link adaption and quality of service (QOS) handling. Such enhancements may include, for instance, sidelink (SL) channel state information (CSI) feedback, SL hybrid automatic repeat request (HARQ) feedback, automatic repeat request (ARQ) schemes, radio link control (RLC) acknowledgement mode (AM), QoS admission control, etc.

Additionally, NR V2X services are expected to be transmitted using different casting schemes. In particular for some applications, such as cooperative driving, dynamic ride sharing, video/sensor data sharing, etc., unicast may be likely needed. For platooning use cases, groupcast communication may be a preferred option. For broad provisioning of alert messages, broadcast communication is instead preferred. Obviously, depending on the specific casting scheme to be used, resource allocation may be different because of different interference/channel conditions and different QoS requirements.

One of the most interesting use cases of NR V2X is the possibility to enable platoon-based communications. For a group of vehicles within a platoon, they may be able to share vehicles status information, such as speed, trajectory, acceleration, etc. for enhanced driving experience. By exchanging such information, vehicles which are part of a platoon can self-organize and maintain a very short distance (down to 1 meter) between each other, so that fuel consumption can be drastically reduced. Additionally, human driver intervention may be less critical due to self-organizing vehicles.

Rules to form a platoon and join/leave the platoon are essentially up to application layers and may take into account different criteria such as the service of interest, which can be associated to the original equipment manufacture (OEM), the trajectory, the speed, the position, the length of the platoon from the lead vehicle to the last vehicle, etc. However, no platoon entity is defined in current legacy RAN specification. In this case, it may be impossible to perform protocols and procedures at radio or RAN layers, for example, procedures related to admission control of platoon members, load balancing and monitoring of radio resources assigned for platoon communications, resource allocation and power control to fulfill the communication range for the platoon communications, etc.

In order to handle a platoon header (or a group header) and related procedures for platoon-based communications, the present disclosure according to some exemplary embodiments proposes to support appointment of a radio layer group header for a device group (such as a platoon), so that members of the device group can be aware of the group header at a radio layer and the corresponding operations for platoon-based communications can be handled at a RAN level. In accordance with some exemplary embodiments, the RAN/radio layer group header may be an agent which can manage communications at RAN/radio level on behalf of the NW. The proposed solution may be used for a number of operations such as resource allocation, admission control, load balancing, power control, etc. It can be appreciated that the radio layer group header may be configured with or without the presence of an application layer group header of the device group.

According to some exemplary embodiments, a UE such as a vehicle UE may be appointed as a platoon header by over the top (OTT) procedures at application layers. For example, during the phase of group or platoon formation, UEs can exchange messages such as discovery messages, containing their position, trajectory, service of interest, OEM of the vehicle, speed, fuel status, etc. Discovery messages are intended to be exchanged over the SL between UEs or over the Uu interface from each UE to a central V2X controller/server. In the former case, the messages are terminated in the application layer of each UE, while in the latter case, all the messages are terminated in the application layers of a V2X server. On the basis of information in the messages, different criteria can be used by the application layer to determine, among the UEs in the proximity or in a given communication range, a UE which can be appointed as a platoon header. For example, a possible criterion may be that the platoon header is the UE which comes first in the heading direction, or the UE which has more fuel. Alternatively or additionally, the platoon header may be manually configured by the OEM, or by the operator/service provider, such that the platoon header is always driven by a human being.

In accordance with some exemplary embodiments, irrespective of the criteria used to appoint a platoon header at the application layer, for example, in response to a UE becoming the platoon header at the application layer, such information about the platoon header may be propagated to the RAN layer. The application layer platoon header may be responsible of platoon management, e.g. platoon joining or leaving.

In accordance with some exemplary embodiments, besides the application layer header, there may be a role of radio/RAN layer header within a platoon. Optionally, the application layer header and the radio/RAN layer header may be or may not be the same. The radio/RAN layer header can handle RAN procedures related to admission control of platoon members, load balancing and monitoring of radio resources assigned for platoon communications, resource allocation and power control to fulfill the communication range for the platoon communications, etc. It can be understood that the term "RAN layer" or "radio layer" as used herein also may be read as "RAN or radio layer" or "RAN/radio layer" or "radio/RAN layer" or "AS layer", and the term "RAN level" or "radio level" as used herein also may be read as "RAN or radio level" or "RAN/radio level" or "radio/RAN level" or "AS level".

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 2:
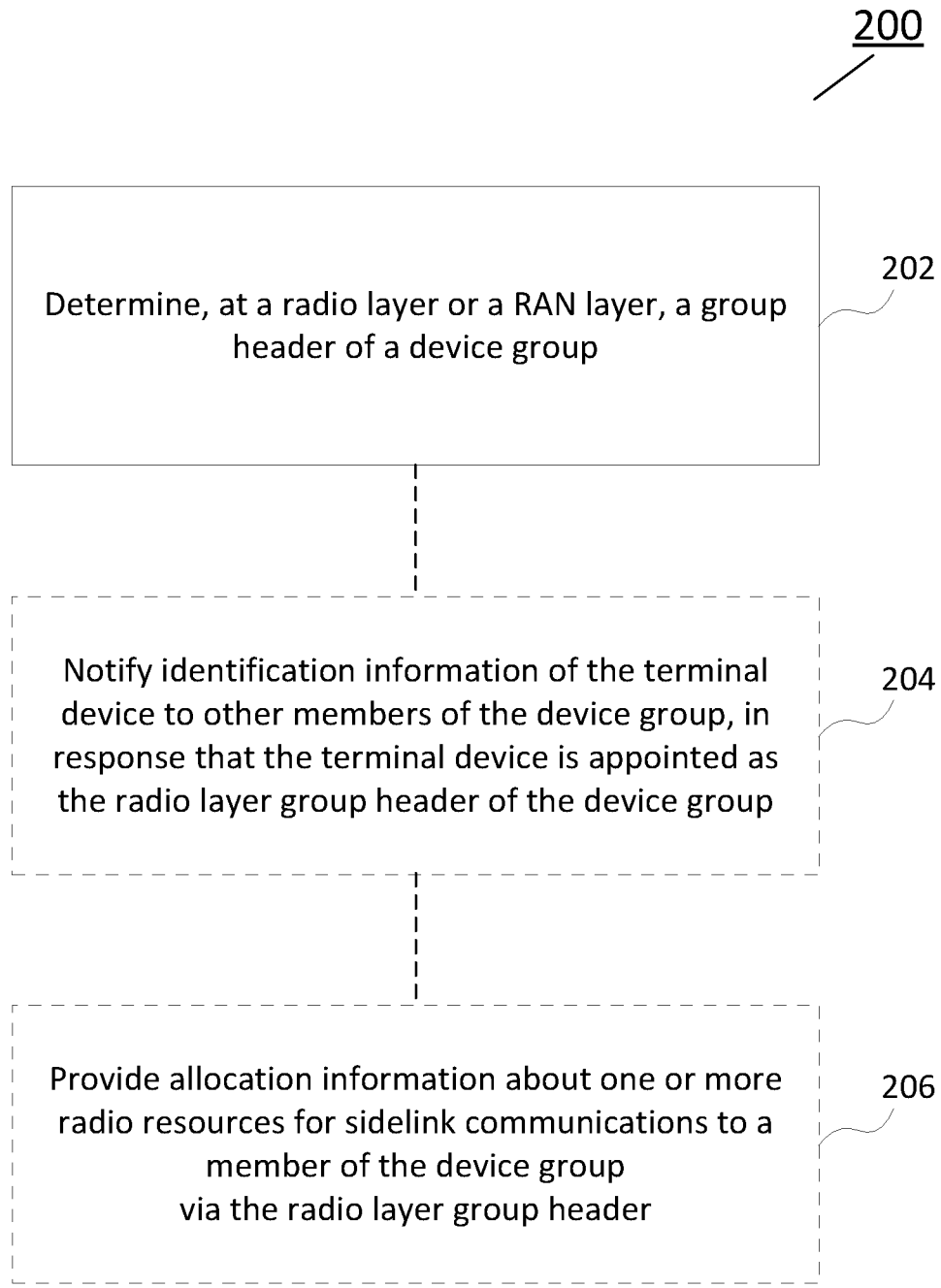
FIG. 2 is a flowchart illustrating a method according to some embodiments of the present disclosure.

FIG. 2 is a flowchart illustrating a method 200 according to some embodiments of the present disclosure. The method 200 illustrated in FIG. 2 may be performed by a first network node or an apparatus communicatively coupled to the first network node. In accordance with an exemplary embodiment, the first network node may comprise a RAN node, for example, a base station such as eNB/gNB. The first network node can be configured to communicate with one or more terminal devices such as UEs which may be able to support sidelink communications. According to an exemplary embodiment, for a device group such as a platoon comprising one or more terminal devices such as vehicle UEs, the first network node can appoint a RAN layer platoon header among the vehicle UEs. Alternatively or additionally, some information about a vehicle UE being appointed as an application layer platoon header also may be propagated to the first network node. It can be appreciated that the RAN layer platoon header may be or may not be the same UE acting as the application layer platoon header. In addition, it can be realized that the terms "platoon" and "platoon header" mentioned herein also may be interpreted as "group" and "group header", respectively.

According to the exemplary method 200 illustrated in FIG. 2, the first network node can determine, at a radio layer or a RAN layer, a group header of a device group, as shown in block 202. The device group may comprise at least a terminal device (such as a UE). In accordance with some exemplary embodiments, the group header may comprise at least one of an application layer group header and a radio layer group header (or a RAN layer group header). The application layer group header is responsible for management of the device group at an application layer, and the radio layer group header is responsible for management of the device group at the radio layer.

In accordance with some exemplary embodiments, the determination of the group header of the device group may comprise: obtaining identification information of the application layer group header from a second network node (e.g., a core network node such as mobility management entity (MME), access and mobility management function (AMF) or session management function (SMF)), the terminal device of the device group, and/or any other possible device which has the identification information of the application layer group header. As such, the first network node can learn the header of the device group from the identification information of the application layer group header. In accordance with some exemplary embodiments, the determination of the group header of the device group may further comprise: determining the radio layer group header of the device group, based at least in part on the identification information of the application layer group header. Optionally, the radio layer group header may be or may not be the same as the application layer group header.

In accordance with some exemplary embodiments, the determination of the group header of the device group may comprise: appointing the terminal device as the radio layer group header of the device group, according to one or more predefined appointment criteria. For example, in response to a fulfillment of the one or more appointment criteria, the first network node (e.g., a gNB or a radio device with gNB function) can appoint the terminal device such as a UE within a platoon as a RAN layer platoon header. In accordance with some exemplary embodiments, the one or more appointment criteria may comprise at least one of the following criteria:

- The UE is associated with a "RAN layer platoon header" subscription/authorization;
  - The "RAN layer platoon header" subscription and authorization may be transferred by a core network node, such as MME/AMF/SMF, to the gNB as part of the UE context when the UE enters a connected mode.
- The UE is appointed as an application layer platoon header by an application function;
- The UE is camping (or it is connected) to a cell different than the cell to which the application layer platoon header is belonging to, or the UE is in a different geographical zone and within a certain distance range from the application layer platoon;
- The UE is in coverage of the gNB;
- The UE has the strongest energy storage among other UEs in the platoon/group;
- The UE has the best channel quality (e.g., estimated path loss) towards to the gNB over the Uu interface;
- The UE is (already) in the RRC_CONNECTED mode and it is located/camping in the cell that the gNB controls;
- The UE is capable of providing the SL radio resources configured by the gNB to other UEs within the platoon via the sidelink;
- The UE within a platoon whose SL channel conditions with respect to the platoon leader are bad, e.g., such UE may issue a performance degradation signal to the gNB when:
  - The block error rate (BLER) of transmissions between the UE and the platoon leader is below a certain threshold;
  - The estimated reference signal received power/reference signal received quality (RSRP/RSRQ) from data and/or control transmissions between this UE and the platoon leader is below a certain threshold.
- The UE is within a platoon whose distance with respect to the application layer platoon leader is above a certain threshold;
- The UE has certain hardware "platoon header" capabilities, e.g. in terms of number of transmitting/receiving (RX/TX) antennas for Uu/SL operations, power class, bands in which the UE can support simultaneous Uu/SL transmissions, etc.
  - The "platoon header" capabilities can be implicitly signaled by signaling these capabilities to the gNB or with a single bit indicating that the UE is capable of becoming a platoon header.

In accordance with some exemplary embodiments, the appointment of the terminal device as the radio layer group header of the device group may be performed by the first network node, in response to a message from the terminal device triggered by one or more predefined events occurring at the terminal device. The message triggered by the one or more predefined events may comprise a group information report from the terminal device, a group header request from the terminal device, and/or any other suitable message which may carry information about appointment of the radio layer group header of the device group.

In accordance with some exemplary embodiments, the one or more predefined events which may occur at a candidate UE of a RAN layer platoon header may comprise at least one of the following events:

- when any of the previously mentioned one or more appointment criteria for appointing a UE as a RAN layer platoon header are fulfilled at the candidate UE side;
- when the role of application layer platoon header changes from one UE to another UE;
- when the candidate UE or the platoon header UE performs an handover towards another cell, or enters a different geographical zone;
- when a UE in the concerned platoon joins/leaves the platoon;
- when platoon dedicated resources are needed, e.g. in the case that the platoon does not have yet SL resources to be used for SL communication, or when platoon communication performances become poor, e.g. BLER experienced by the platoon header is below a certain percentage, no packets received in a certain time window, etc.

In accordance with some exemplary embodiments, the message triggered by the one or more predefined events may indicate that the terminal device requests to become the radio layer group header. According to an exemplary embodiment, a UE (also referred to as candidate UE) may explicitly send a "platoon header request" to be a RAN layer platoon header or implies this request by sending the "platoon information" report to a gNB, for example, in the case that certain conditions are fulfilled (e.g., the one or more predefined events occurring) at the UE side. The gNB may then confirm or reject to the candidate UE, for example, depending on whether the previously mentioned one or more appointment criteria for appointing a UE as a RAN layer platoon header are fulfilled. Optionally, the gNB may inform some core NW nodes such as MME/AMF/SMF, about the candidate UE's request of becoming a RAN layer platoon header and issue a "platoon header confirmation/reject" response, for example, only upon acknowledgment from the core NW nodes. The gNB and potentially the core NW node(s) may also inform all the other platoon members of the identity of the RAN layer platoon header newly appointed.

Alternatively, the message triggered by the one or more predefined events may indicate that the terminal device appoints itself as the radio layer group header. In this embodiment, the terminal device can appoint itself as the radio layer group header, for example, in response to occurrence of the one or more predefined events at the terminal device. Thus, occurrence of the one or more predefined events at the terminal device can trigger the terminal device to send the message to the first network node, so as to report the autonomous appointment of the radio layer group header by the terminal device, or to request the appointment of the radio layer group header by the first network node.

In accordance with some exemplary embodiments, the message triggered by the one or more predefined events may be received by the first network node from the terminal device through an information element (IE) containing one or more parameters related to the device group. For example, the message such as the platoon information report or the platoon header request can be conveyed by a UE via a radio resource control (RRC) connection to a gNB through a dedicated IE containing one or more parameters related to the device group, which may comprises at least one of the following parameters:

the group identity (ID), e.g. the L2 group destination ID as assigned by upper layers to the concerned group;
the members of the group, e.g. the L2 source ID as assigned by upper layers to a UE which is a member of the concerned group;
the L2 source ID of the application layer group header, which may be the same UE or a different UE compared with the UE issuing the platoon information report or the platoon header request;
the cell ID in which each group member is currently located;
the cell ID in which the RAN layer group header is currently located;
the set of time/frequency resources needed for SL group communications.

According to an exemplary embodiment, if the UE is in the idle mode, the request or report of becoming a RAN layer group header may be a trigger to enter the connected mode. In the case that the UE is appointed as the RAN layer group header, the UE may stay in the connected mode as long as it keeps the group header status.

In accordance with some exemplary embodiments, the first network node (such as a gNB) can inform a second network node (such as a core network node) of at least part of the message triggered by the one or more predefined events. For example, the first network node may transmit to the second network node certain information about appointment of the radio layer group header, for example, autonomous appointment of the radio layer group header by the terminal device or requesting appointment of the radio layer group header by the terminal device.

In accordance with some exemplary embodiments, the first network node can issue a response to the message triggered by the one or more predefined events. The response issued by the first network node may indicate confirmation or rejection of the appointment of the radio layer group header to the terminal device. Optionally, the response may be issued based at least in part on the acknowledgment on the appointment of the radio layer group header from the second network node.

In accordance with some exemplary embodiments, there may be a case that more than one UE in the same group transmits the message (such as a platoon information report or a platoon header request to the gNB) triggered by the one or more predefined events. This case may happen, for example, when there is no radio layer header or application layer header, and the one or more predefined events occur at more than one UE before a new radio or application layer header is appointed. Alternatively, this case may happen when a UE in the group is not aware that a new radio or application layer header has been appointed, and any of the one or more predefined events occurs at this UE. This may result in more than one UE in the same group sending the message triggered by the one or more predefined events to the same gNB. The gNB may then determine which UE is to be appointed as the radio layer group header, for example, by using any of the previously mentioned appointment criteria. Alternatively, the gNB may simply appoint the UE from which the message was received first, as the radio layer group header.

According to the exemplary method 200 illustrated in FIG. 2, the first network node may optionally notify identification information of the terminal device to other members of the device group, in response that the terminal device is appointed as the radio layer group header of the device group, as shown in block 204. For instance, in response to the message triggered by the one or more predefined events occurring at a UE, a gNB can appoint the UE as the radio layer group header of the group. The gNB may also signal the information about the UE being appointed as the radio layer group header in a notification to the UE and optionally other UEs in the group, e.g. using RRC signaling dedicated for the specific group, and indicating the identity of the UE appointed as the radio layer group header, or simply a flag indicating that now this device group has a header. Alternatively or additionally, upon reception of the response from the gNB to confirm the appointment of the radio layer group header, the UE may advertise other UEs in the device group that it has become the radio layer group header via SL signaling.

In accordance with some exemplary embodiments, the first network node (such as the gNB) may transmit update information about the device group to a second network node (such as a core network node). For example, the gNB may further forward (e.g., the relatively static part of) the group/platoon information to the core network node(s). Later on the group/platoon information no more needs to be transmitted, or only the dynamic part needs to be transmitted to the core network node(s).

In accordance with some exemplary embodiments, the first network node may assign a higher priority for communications with the group header of the device group than communications with other devices. For example, the gNB may give higher priority for communications with the application layer platoon header, and in the case that there are not enough radio resources available to schedule the communications with the application layer platoon header, the gNB may preempt other communications in the system which has less priority.

In addition to the UE initiated group or platoon handling over Uu interface, the V2X server initiated group or platoon handling over Uu interface is also possible. According to an embodiment in which the V2X server appoints a UE to be the application layer platoon header, and signals (e.g., the relatively static part of) platoon information to the core network node(s). The core network node(s), such as SMF, may also associate the platoon information with a specific QoS profile, for example, including 5G QoS indicator (5QI) and/or allocation and retention priority (ARP) value for admission control purposed in RAN nodes. The core network node(s) may indicate the identity of the UE which is appointed as the application layer platoon header to a gNB.

Optionally, the gNBs may trigger a paging procedure to page this UE. Upon receiving the information about the application layer platoon header from higher layers, the gNB may determine whether to appoint this UE as platoon header or not, for example, taking into account the one or more appointment criteria as previously described. The gNB may then send a message to the UE and/or to the V2X server, so as to confirm or reject a request of appointing the UE as the platoon header from the V2X server. In the case that the UE is appointed as the RAN layer platoon header, the RAN functionalities of the UE may be enabled to perform platoon handling.

In accordance with some exemplary embodiments, the first network node may perform radio resource allocation for sidelink communications of the device group, based at least in part on information about the device group. Optionally, the first network node can provide allocation information about one or more radio resources for sidelink communications to a member of the device group via the radio layer group header, as shown in block 206 of FIG. 2. For example, the first network node such as a gNB may provide, via a resource allocation function, one or more dedicated sets of resources (such as one or more resource pools) for platoon communications over the sidelink to be used by all platoon members when communicating with each other. Such dedicated set of resources may be communicated to the platoon members via the RAN layer platoon header.

In accordance with some exemplary embodiments, the resource allocation function at the gNB may be performed, for example, upon reception of a message such as a "platoon information" report, from which the gNB may figure out the platoon members and also their connectivity status. The gNB may also consider the amount of UEs in the platoon as an input factor to the resource allocation function. For example, the gNB may expect different radio resource consumption depending on the amount of UEs in the platoon as signaled in the "platoon information" report.

In accordance with some exemplary embodiments, the radio layer group header may be in charge of performing group admission control with other group members. Optionally, the first network node may participate at least partly in an admission control process for a candidate member of the device group via the radio layer group header. In this case, the first network node such as gNB may be involved in the group admission control. For example, a group admission request may be sent from a group member to the gNB potentially via the RAN layer group header, and the group admission request may contain the needed information for decide whether to accept the group admission request or not. Upon making the decision, the gNB signals its decision to the concerned group member, the RAN layer group header, and optionally also other members in the group, potentially via the RAN layer group header. Optionally, the RAN layer group header may perform a second admission control based on the (local) information it has.

Figure 3:
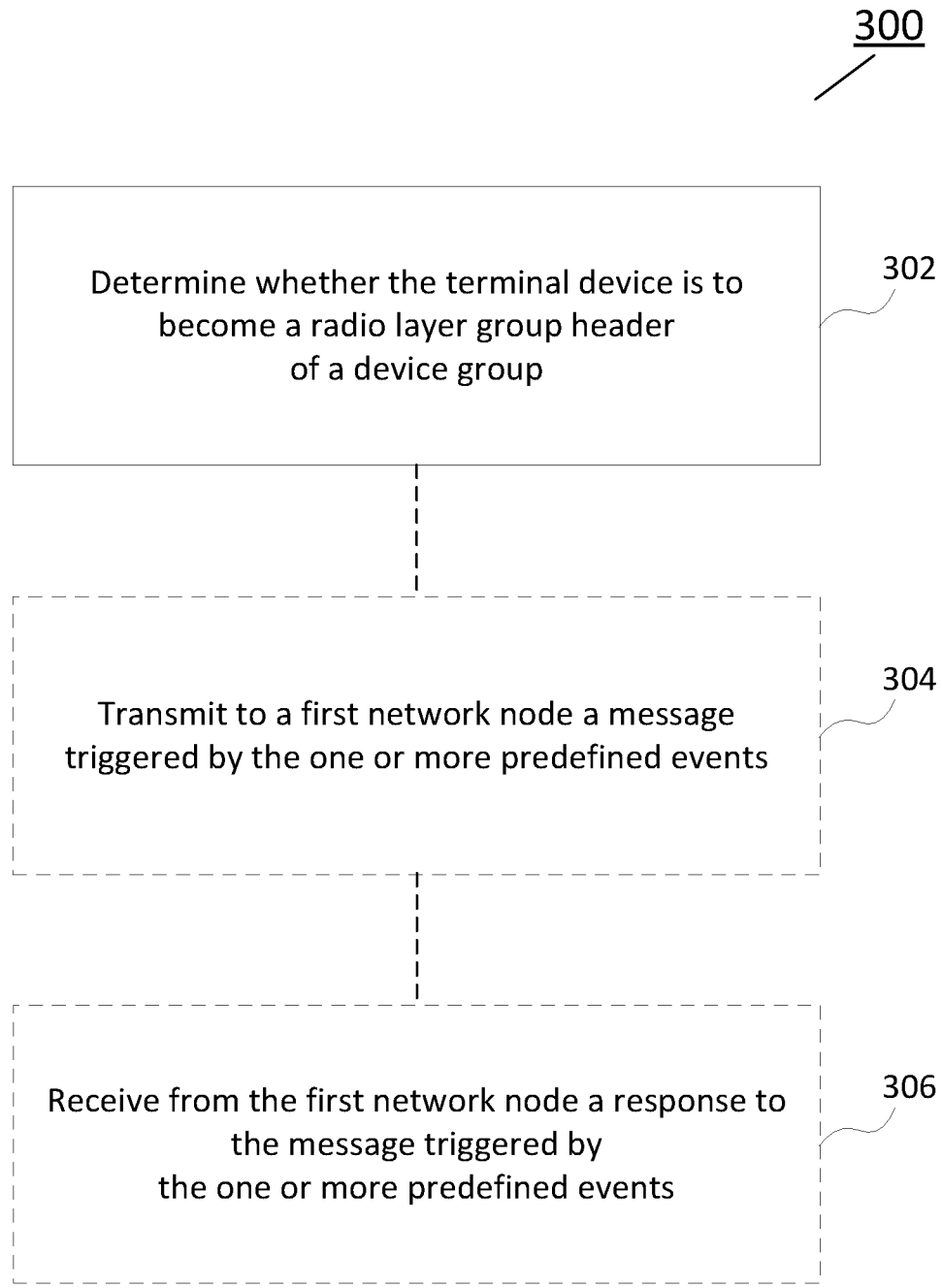
FIG. 3 is a flowchart illustrating another method according to some embodiments of the present disclosure.

FIG. 3 is a flowchart illustrating a method 300 according to some embodiments of the present disclosure. The method 300 illustrated in FIG. 3 may be performed by a terminal device or an apparatus communicatively coupled to the terminal device. In accordance with an exemplary embodiment, the terminal device such as a UE may be configured to communicate with a first network node such as a base station and support V2X or sidelink communication. In accordance with some exemplary embodiments, the terminal device and optionally one or more other terminal devices may form a device group such as a platoon within which device status information may be shared. In accordance with some exemplary embodiments, the terminal device such as a vehicle UE may be appointed as a platoon header through an application function defined at an application layer, e.g. upon exchanging messages over the SL with other potential UE members of the platoon. The application function in this vehicle UE may enable platoon header functionalities for the vehicle UE. Alternatively or additionally, a V2X function in a V2X server residing in a cloud node also may enable the platoon header functionalities for the vehicle UE.

According to the exemplary method 300 illustrated in FIG. 3, the terminal device can determine whether the terminal device is to become a radio layer group header (or a RAN layer group header) of a device group, as shown in block 302. The device group may comprise at least the terminal device and optionally one or more other terminal devices. The radio layer group header of the device group may be responsible for management of the device group at a radio layer (or a RAN layer).

In accordance with some exemplary embodiments, the terminal device may receive, at the radio layer, indication information of an application layer group header of the device group from an application layer. The application layer group header is responsible for management of the device group at the application layer. The radio layer group header and the application layer group header may be the same terminal device or different terminal devices.

In accordance with some exemplary embodiments, the determination of whether the terminal device is to become the radio layer group header of the device group may comprise: determining to appoint the terminal device itself as the radio layer group header of the device group, in response to occurrence of one or more predefined events at the terminal device. Alternatively, the determination of whether the terminal device is to become the radio layer group header of the device group may comprise: determining to request to become the radio layer group header of the device group, in response to occurrence of one or more predefined events at the terminal device. In accordance with some exemplary embodiments, the one or more predefined events mentioned here may comprise the one or more predefined events as described in connection with FIG. 2.

According to the exemplary method 300 illustrated in FIG. 3, the terminal device may optionally transmit to a first network node (e.g., the first network node as described with respect to FIG. 2) a message triggered by the one or more predefined events, as shown in block 304. As described in connection with FIG. 2, the message triggered by the one or more predefined events may comprise at least one of a group information report and a group header request from the terminal device. The transmitted message can enable the first network to determine the radio layer group header of the device group.

In accordance with some exemplary embodiments, the message triggered by the one or more predefined events may indicate that the terminal device appoints itself as the radio layer group header of the device group. Alternatively, the message triggered by the one or more predefined events may indicate that the terminal device requests to become the radio layer group header of the device group. For instance, a UE at which one or more predefined events occurred may request a gNB to appoint the UE as a radio layer group header. Alternatively, a UE at which one or more predefined events occurred may send an indication that this UE has become the radio layer group header, for example, via an RRC connection to a gNB and optionally to other UEs in the group via sidelinks.

In accordance with some exemplary embodiments, the message triggered by the one or more predefined events may be transmitted to the first network node through an IE containing one or more parameters related to the device group. For example, the one or more parameters related to the device group may comprise some parameters indicating status information about the device group and/or group members, such as those as described with respect to FIG. 2.

In accordance with some exemplary embodiments, the members of the device group may be in different RRC status. For example, some UEs in the group stay in the connected mode if they are within the coverage of the serving gNB, while other UEs may go instead to the idle/inactive mode. According to an exemplary embodiment, the message triggered by the one or more predefined events may enable the terminal device to enter a connected mode from an idle mode. In an exemplary embodiment, the terminal device may stay in a connected mode during the terminal device being appointed as a group header such as the radio layer group header and/or an application layer group header of the device group.

In accordance with some exemplary embodiments, the terminal device may stay in a connected mode according to one or more predefined status criteria. For example, a UE may stay in the connected mode in response to fulfillment of the one or more predefined status criteria such as:
  The UE is appointed as the radio layer platoon header or the application layer header and for the whole time in which the UE is the radio layer group header or the application layer group header.
  The UE is configured by the network with a dedicated set of resources.
  The one or more appointment criteria as described with respect to FIG. 2 are fulfilled.
  For this UE (as a first UE), a second UE that is preceding the first UE is on a different cell, and a third UE that is following the first UE is on the same cell.

According to the exemplary method 300 illustrated in FIG. 3, the terminal device may optionally receive from the first network node a response to the message triggered by the one or more predefined events, as shown in block 306. According to the content of the triggered message transmitted from the terminal device to the first network, the response to the message may indicate confirmation or rejection of the appointment of the radio layer group header. In the case that the terminal device autonomously appoints itself as the radio layer group header and sends the message to report such appointment, the response from the first network node may not be necessary.

In accordance with some exemplary embodiments, the radio layer group header may need to perform some tasks different from other group members. For example, the UE acting as the RAN layer platoon header may be in charge of performing group admission control with other group members. Each group member may be aware of the RAN layer platoon header either from the application layer or from the platoon information forwarded by the network, for example, by the first network node according to the method 200 as described in connection with FIG. 2. Therefore, when the RAN layer platoon header has been known, any platoon member can send a group admission request to the RAN layer platoon header in the initial admission control process after the group UE discovery phase.

According to an exemplary embodiment where the terminal device is appointed as the radio layer group header, the terminal device may indicate to other terminal devices in the device group, for example, in sidelink control information, that the terminal device is the radio layer group header of the device group. As the radio layer group header, the terminal device may perform an admission control process for a candidate member of the device group, according to one or more admission control criteria. Optionally, the terminal device may remove a member of the device group from the device group, according to one or more removal criteria. It can be understood that the one or more admission control criteria and the one or more removal criteria may be at least partly the same. Optionally, the terminal device may use groupcast communications to signal, within the device group, a change of the device group, for example, addition and/or removal of one or more group members, etc.

In accordance with some exemplary embodiments, the RAN layer group header may accept or reject a group admission request of a UE, according to the one or more admission control criteria comprising at least one of the following criteria:
  amount of UEs that are already forming the group, which may depend on the UE capabilities;
  amount of unicast and/or groupcast and/or broadcast sessions/connections that the RAN layer group header is currently handling;
  the maximal amount of unicast and/or groupcast and/or broadcast sessions/connections that the RAN layer group can handle;
  estimated distance (e.g., in meters) between the RAN layer group header and the new candidate group member (the distance may be compared with the communication range required for this group communication);
  coexistence issue with other ongoing unicast and/or groupcast and/or broadcast sessions/connections that the RAN layer group header is currently handling, e.g. in terms of radio resources that may collide between different sessions, and power left to be allocated to this additional link;
  channel estimation, e.g. RSPR/RSRQ, evaluated from data/control transmissions exchanged between the RAN layer group header and the new candidate group member;
  level of interference/congestion measured by the RAN layer group header and compared with the QoS level required for communications within this group (for different level of QoS, there may be different requirements, e.g. QoS class indicator/5G QoS indicator/V2X QoS indicator (QCI/5QI/VQI) or communication range, in the maximum sustainable level of interference/congestion that can be accepted;
  the subscribed mobile network operator (MNO) of the candidate group member;
  the connected cell IDs of the candidate group member;
  priority of the candidate UE or data traffic which the candidate UE intends to generate as per configuration (it is assumed that different vehicles or different data traffic may be configured by application or network with different priority, e.g. QCI, ARP, etc.);

In accordance with some exemplary embodiments, the above criteria and related values/thresholds may be preconfigured in a UE or configured by the network. The above criteria may also be used to reject/release from the group a UE already in the group. Upon determining whether to admit or reject a candidate UE from a group, the RAN layer group header signals its decision to the concerned UE, and optionally also to the other UEs in the group using groupcast communication control signaling, e.g. RRC signaling.

Alternatively or additionally, the group admission control as mentioned above may be performed directly by the candidate UE which is interested in joining the group. In this case, the candidate UE may (first) perform the "local admission control". For example, the candidate UE may evaluate the channel conditions between itself and the RAN layer group header by computing the RSRP/RSRQ from the reference signals included in any transmissions from the RAN layer group header, e.g. control transmission in physical sidelink control channel (PSCCH) and/or data transmission in physical sidelink shared channel (PSSCH), and/or broadcasting transmissions in physical sidelink broadcast channel (PSBCH). If the RSRP/RSRQ of the link between this candidate UE and the RAN layer group header is acceptable for the concerned QoS requirement, the RAN layers of the candidate UE indicate to upper layers that the candidate UE can join the concerned group. Optionally, the candidate UE may send an admission request to the RAN layer group header, which may perform a second admission control based on the (local) information it has.

According to an exemplary embodiment, the RAN layer group header may indicate in the sidenlink control information (SCI) over the PSCCH, e.g. with a flag, that it is the RAN layer group header and possibly the ID of the group which the RAN layer group header is leading. Upon decoding the SCI, the group members can perform RSRP/RSRQ evaluation and from that derive an estimation of the path loss considering the transmission power of reference signals for the RAN layer group header.

In accordance with some exemplary embodiments, the terminal device which is appointed as the radio layer group header can perform management of sidelink communications of the device group. For example, the terminal device acting as a RAN layer platoon header may perform at least one of the following tasks:
  admission control;
  HARQ feedback transmission to a group member upon reception of SL data;
  providing SL resource allocation to other UEs in the group via SL (e.g., the allocated SL resource may be allocated by the gNB for SL group operations within the group and signaled to the RAN layer group header);
  adjusting the transmission power of group members on the basis of the current group size;
  channel state information (CSI) transmissions to a group member in periodic fashion or upon certain events, e.g. when channel quality between the group header and a group member is decreasing more than a certain threshold.

In accordance with some exemplary embodiments, the terminal device which is appointed as the radio layer group header can receive, from the first network node (such as the first network node as described with respect to FIG. 2), allocation information about one or more radio resources for sidelink communications of a member of the device group. Then the terminal device may forward the allocation information to the member of the device group. According to an exemplary embodiment, the allocation information forwarded to the group member may comprise information related to SL resource allocation such as:
  the set of SL radio resources to be used for platoon communication by the group member;
  the cell ID(s) or a zone area ID (in case of out of coverage) in which such set of SL radio resources are valid, so that the group member may discard the this set of SL radio resources if it is located in a different cell or in a different zone area;
  the cell ID in which the group header is located and the PLMN ID, so that a group member may discard this set of SL radio resources if it is located in a different cell or it can trigger a message (e.g., a group information report or a group header request) according to the one or more predefined criteria as described in connection with FIG. 2;
  the position of the group header in the group;
  the geographical coordinates of the group header and/or the speed at which the group header is travelling.

In accordance with some exemplary embodiments, the terminal device may determine not to become the radio layer group header of the device group. In response to this, the terminal device may obtain identification information of the radio layer group header of the device group from at least one of the radio layer group header and the first network node (such as a gNB). In this case, the terminal device may act as a group member rather than the radio layer group header of the device group. For example, the group member may perform at least one of the following tasks:
  estimating RSRP/RSRQ and path loss according to transmissions related to the RAN layer group header;
  adjusting power control on the basis of the estimated path loss and communication range requirement;
  performing "local admission control" on the basis of the estimated RSRP/RSRQ and path loss according to transmissions related to the RAN layer group header.

According to an exemplary embodiment where the terminal device is not appointed as the radio layer group header, the terminal device may receive configuration information about sidelink communications of the terminal device from the radio layer group header. Based at least in part on the received configuration information, the terminal device can perform the sidelink communications.

In accordance with some exemplary embodiments, the terminal device may be interested in joining another device group. In this case, the terminal device can transmit a group admission request to another radio layer group header of another device group to join the another device group. Optionally, the terminal device may receive, from the another radio layer group header, a response to the group admission request to indicate whether the terminal device is admitted to join the another device group.

Alternatively or additionally, the terminal device may perform an admission control process to join another device group, based at least in part on local information of the terminal device. In this case, the terminal device can evaluate the channel condition between itself and said another radio layer group header. If the evaluated channel condition is acceptable, the terminal device indicates to upper layers that the terminal device can join the concerned group. Optionally the terminal device may send an admission request to said another radio layer group header which can perform a second admission control for the terminal device.

Figure 4:
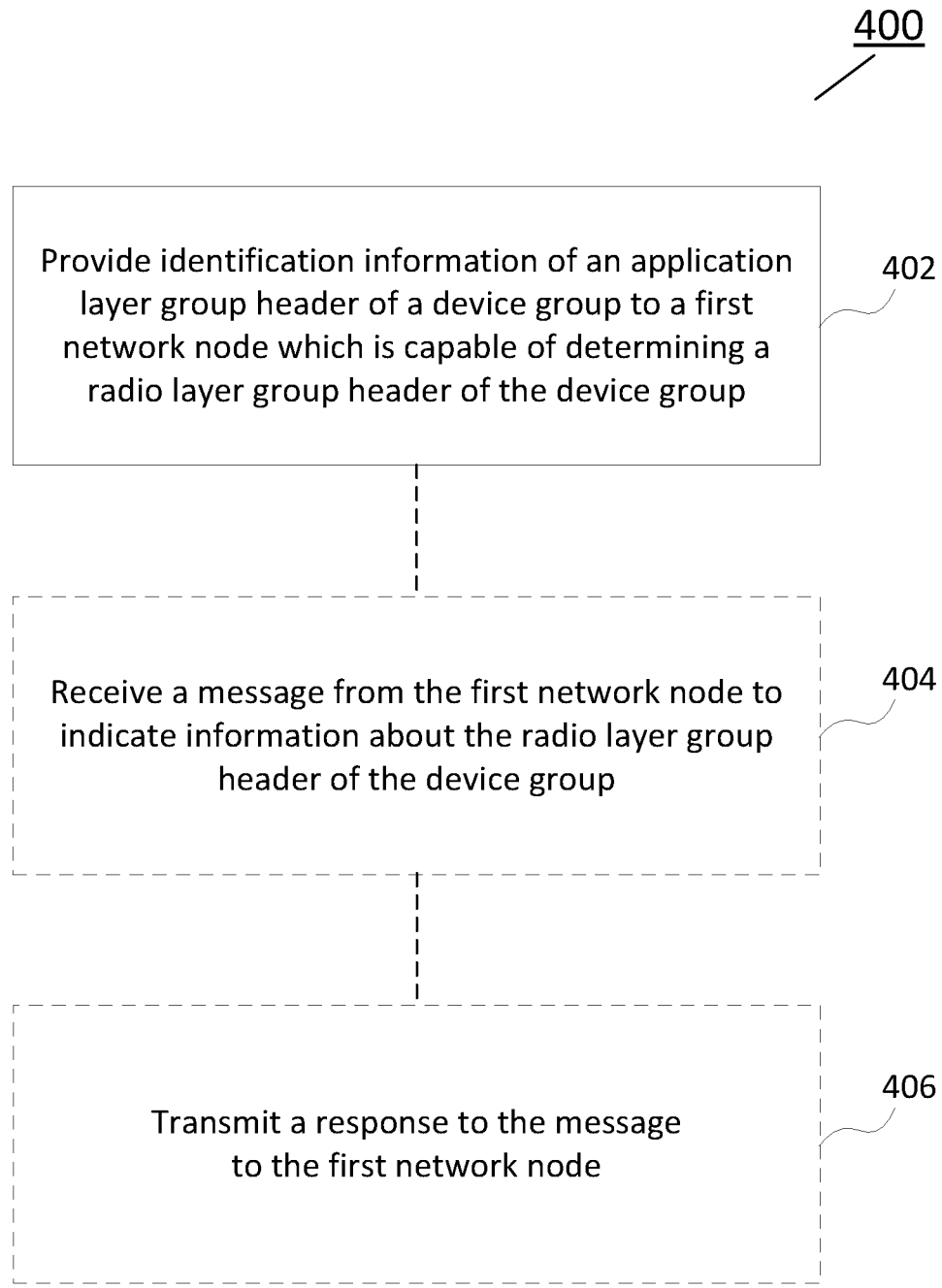
FIG. 4 is a flowchart illustrating yet another method according to some embodiments of the present disclosure.

FIG. 4 is a flowchart illustrating a method 400 according to some embodiments of the present disclosure. The method 400 illustrated in FIG. 4 may be performed by a second network node or an apparatus communicatively coupled to the second network node. In accordance with an exemplary embodiment, the second network node may comprise a core network node such as MME/AMF/SMF. The second network node can be configured to identify a group header of a device group according to certain information provided by a server (such as a V2X server) and/or a first network node (such as a RAN node).

According to the exemplary method 400 illustrated in FIG. 4, the second network node can provide identification information of an application layer group header of a device group to a first network node, as shown in block 402. The first network node is capable of determining a radio layer group header (or a RAN layer group header) of the device group, for example, according to the method 200 as described in connection with FIG. 2. As mentioned previously, the application layer group header may be responsible for management of the device group at an application layer, and the radio layer group header may be responsible for management of the device group at a radio layer (or a RAN layer).

Optionally, the second network node may receive a message from the first network node to indicate information about the radio layer group header of the device group, as shown in block 404 of FIG. 4. For example, the message from the first network node may indicate that a terminal device appoints itself as the radio layer group header of the device group, or requests to become the radio layer group header. The second network node may optionally transmit a response to the message to the first network node, as shown in block 406 of FIG. 4. For example, the response transmitted to the first network node may comprise acknowledgment or negative acknowledgment by the second network node with respect to the message from the first network node.

In accordance with some exemplary embodiments, the second network node may receive update information about the device group from the first network node. For example, the update information may indicate a change of the radio layer group header of the device group. Alternatively or additionally, the update information may indicate a change of members of the device group. Optionally, the second network node may also inform all the other group members of the identity of the radio layer group header newly appointed.

The proposed solution according to one or more exemplary embodiments can enable a terminal device such as a vehicle UE to be appointed as a radio/RAN layer header within a group of terminal devices (such as a platoon). In accordance with some exemplary embodiments, the radio/RAN layer header of the platoon can utilize some related RAN functions to handle SL operations and/or Uu operations, so as to improve performance of platoon-based communications and enhance resource utilization.

The various blocks shown in FIGS. 2-4 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 5:
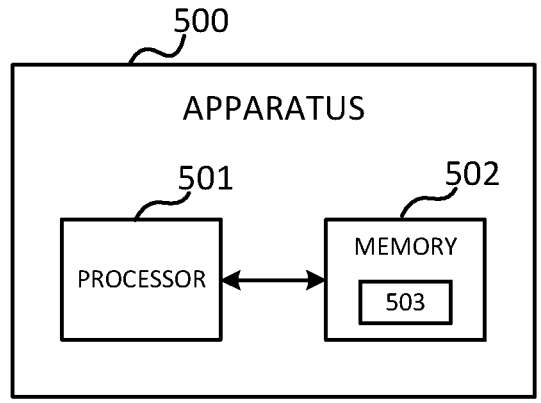
FIG. 5 is a block diagram illustrating an apparatus according to some embodiments of the present disclosure.

FIG. 5 is a block diagram illustrating an apparatus 500 according to various embodiments of the present disclosure. As shown in FIG. 5, the apparatus 500 may comprise one or more processors such as processor 501 and one or more memories such as memory 502 storing computer program codes 503. The memory 502 may be non-transitory machine/processor/computer readable storage medium. In accordance with some exemplary embodiments, the apparatus 500 may be implemented as an integrated circuit chip or module that can be plugged or installed into a first network node as described with respect to FIG. 2, a terminal device as described with respect to FIG. 3 or a second network node as described with respect to FIG. 4. In such case, the apparatus 500 may be implemented as a first network node as described with respect to FIG. 2, a terminal device as described with respect to FIG. 3 or a second network node as described with respect to FIG. 4.

In some implementations, the one or more memories 502 and the computer program codes 503 may be configured to, with the one or more processors 501, cause the apparatus 500 at least to perform any operation of the method as described in connection with FIG. 2. In other implementations, the one or more memories 502 and the computer program codes 503 may be configured to, with the one or more processors 501, cause the apparatus 500 at least to perform any operation of the method as described in connection with FIG. 3. In other implementations, the one or more memories 502 and the computer program codes 503 may be configured to, with the one or more processors 501, cause the apparatus 500 at least to perform any operation of the method as described in connection with FIG. 4. Alternatively or additionally, the one or more memories 502 and the computer program codes 503 may be configured to, with the one or more processors 501, cause the apparatus 500 at least to perform more or less operations to implement the proposed methods according to the exemplary embodiments of the present disclosure.

Figure 6:
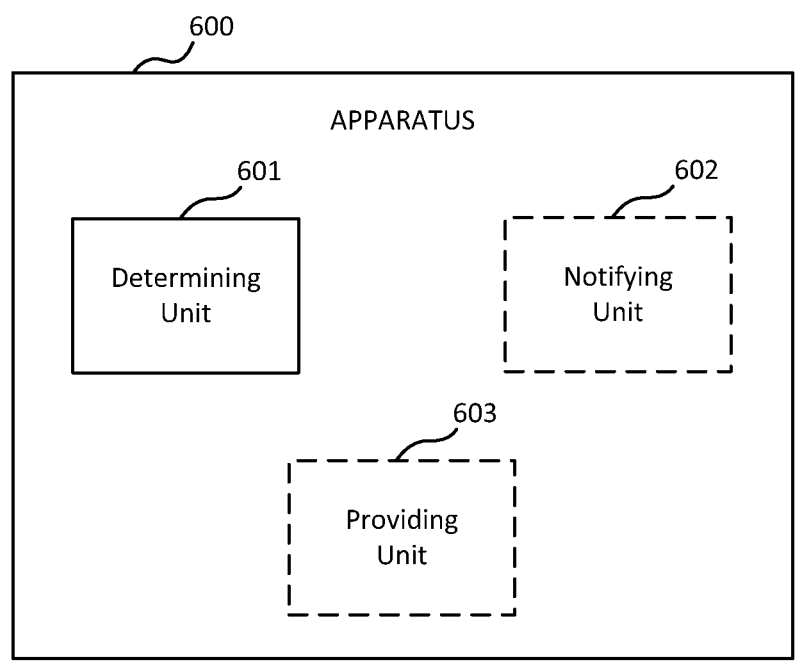
FIG. 6 is a block diagram illustrating another apparatus according to some embodiments of the present disclosure.

FIG. 6 is a block diagram illustrating an apparatus 600 according to some embodiments of the present disclosure. As shown in FIG. 6, the apparatus 600 may comprise a determining unit 601, and optionally a notifying unit 602 and a providing unit 603. In an exemplary embodiment, the apparatus 600 may be implemented in a first network node such as a RAN node. The determining unit 601 may be operable to carry out the operation in block 202, the notifying unit 602 may be operable to carry out the operation in block 204, and the providing unit 603 may be operable to carry out the operation in block 206. Optionally, the determining unit 601, the notifying unit 602 and/or the providing unit 603 may be operable to carry out more or less operations to implement the proposed methods according to the exemplary embodiments of the present disclosure.

Figure 7:
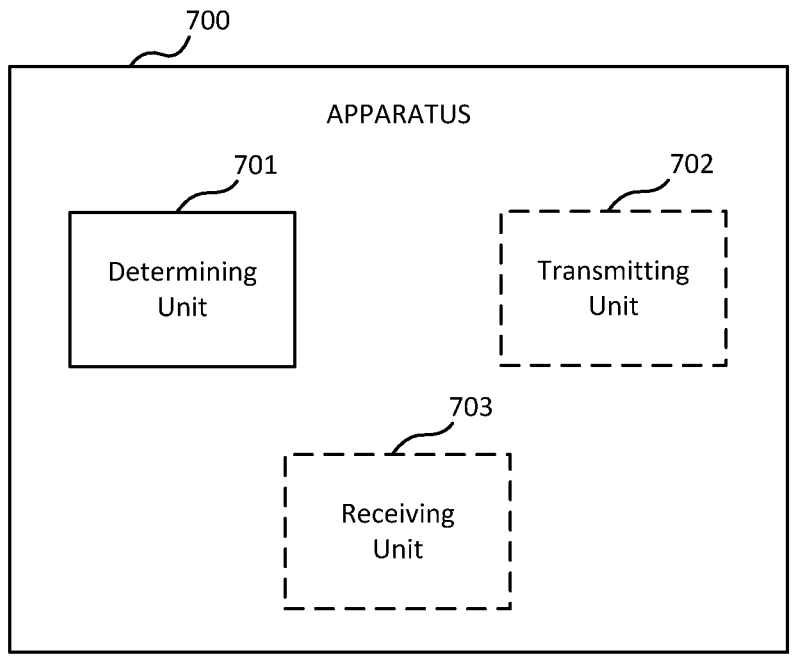
FIG. 7 is a block diagram illustrating yet another apparatus according to some embodiments of the present disclosure.

FIG. 7 is a block diagram illustrating an apparatus 700 according to some embodiments of the present disclosure. As shown in FIG. 7, the apparatus 700 may comprise a determining unit 701, and optionally a transmitting unit 702 and a receiving unit 703. In an exemplary embodiment, the apparatus 700 may be implemented in a terminal device such as UE. The determining unit 701 may be operable to carry out the operation in block 302, the transmitting unit 702 may be operable to carry out the operation in block 304, and the receiving unit 703 may be operable to carry out the operation in block 306. Optionally, the determining unit 701, the transmitting unit 702 and/or the receiving unit 703 may be operable to carry out more or less operations to implement the proposed methods according to the exemplary embodiments of the present disclosure.

Figure 8:
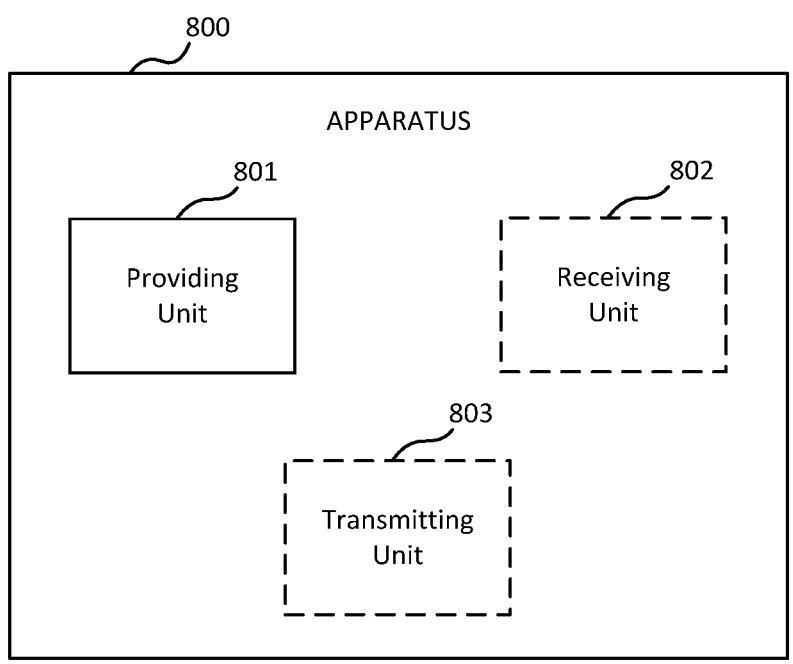
FIG. 8 is a block diagram illustrating a further apparatus according to some embodiments of the present disclosure.

FIG. 8 is a block diagram illustrating an apparatus 800 according to some embodiments of the present disclosure. As shown in FIG. 8, the apparatus 800 may comprise a providing unit 801, and optionally a receiving unit 802 and a transmitting unit 803. In an exemplary embodiment, the apparatus 800 may be implemented in a second network node such as a core network node. The providing unit 801 may be operable to carry out the operation in block 402, the receiving unit 802 may be operable to carry out the operation in block 404, and the transmitting unit 803 may be operable to carry out the operation in block 406. Optionally, the providing unit 801, the receiving unit 802 and/or the transmitting unit 803 may be operable to carry out more or less operations to implement the proposed methods according to the exemplary embodiments of the present disclosure.

Figure 9:
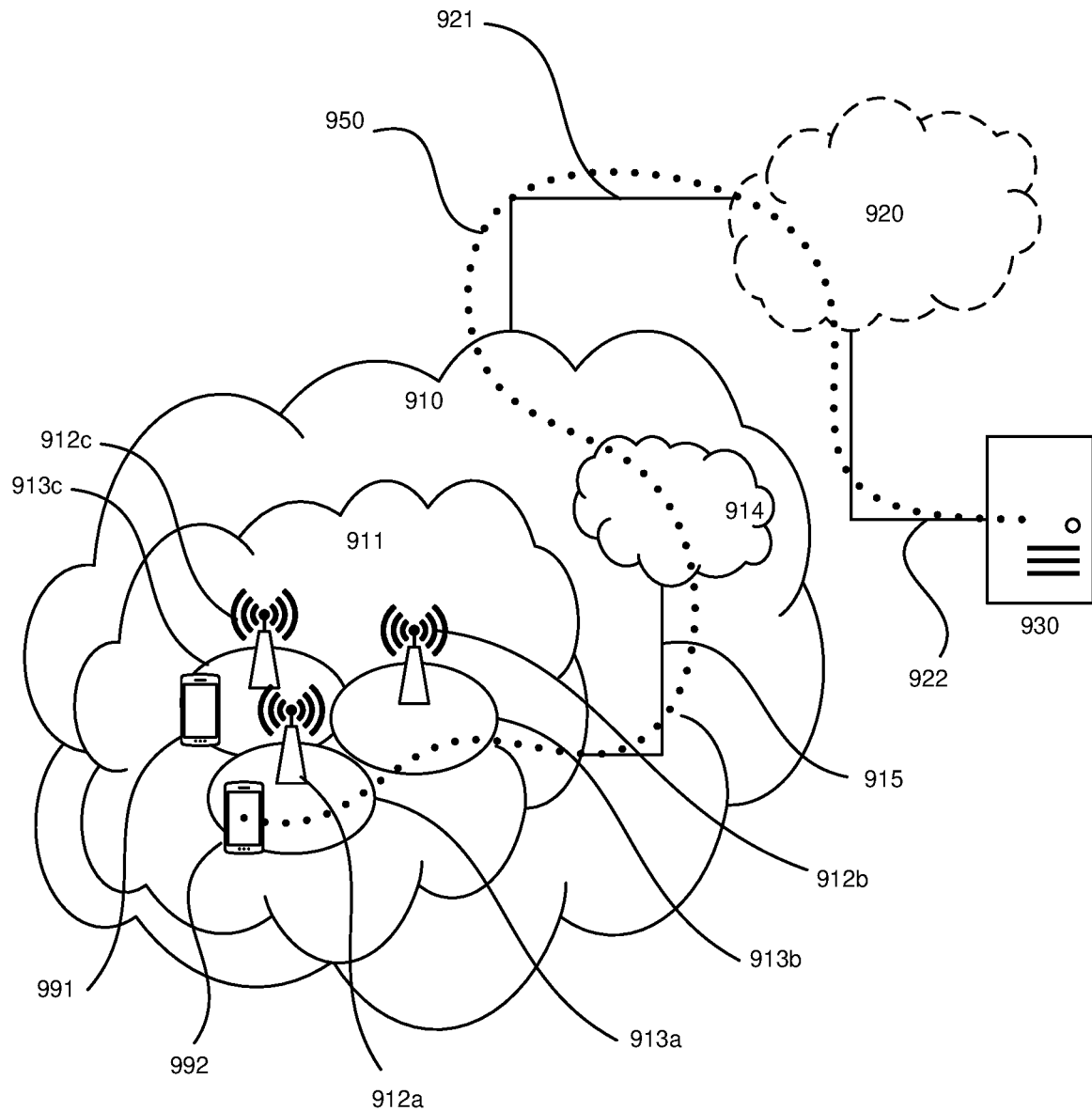
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
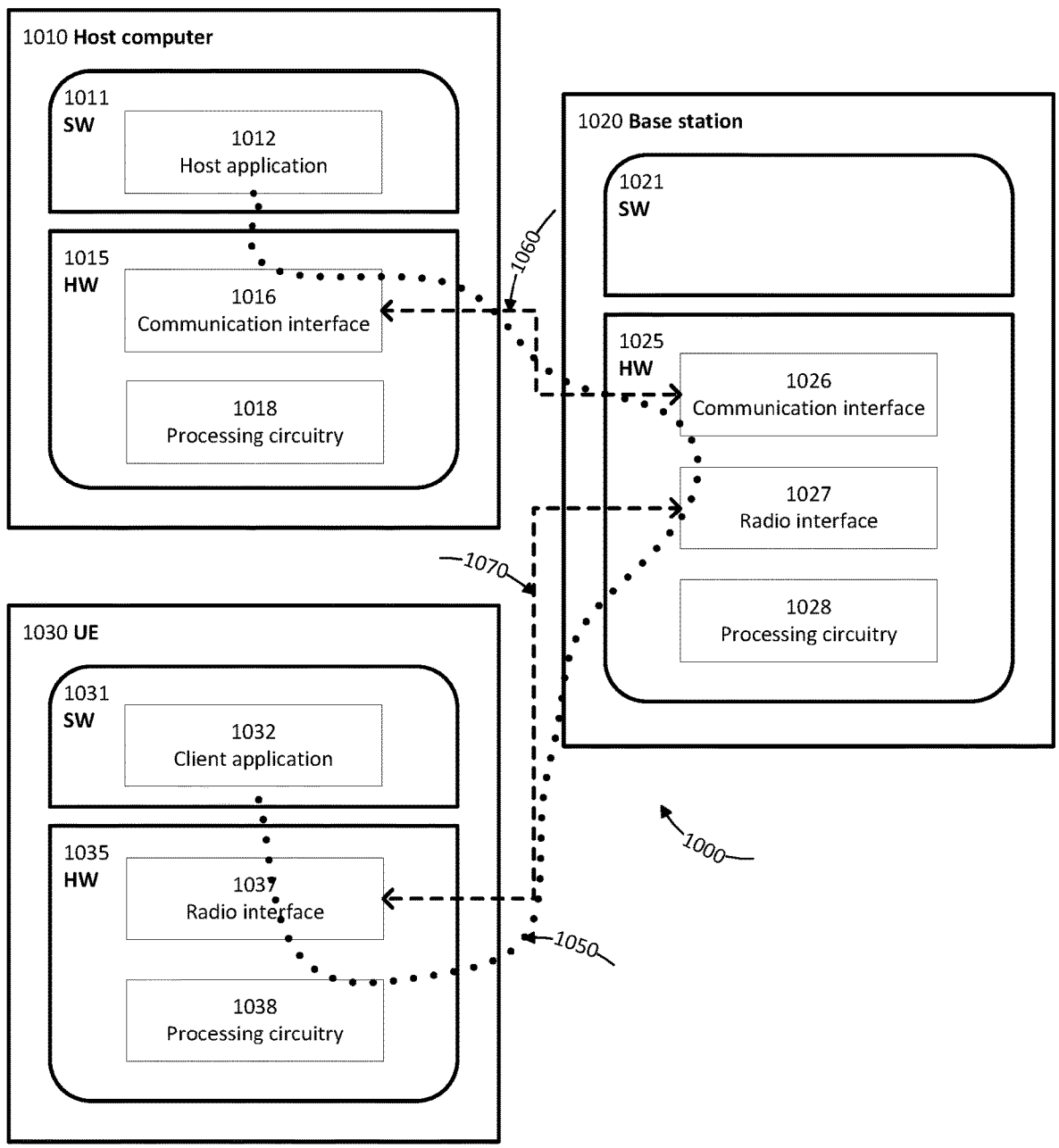
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
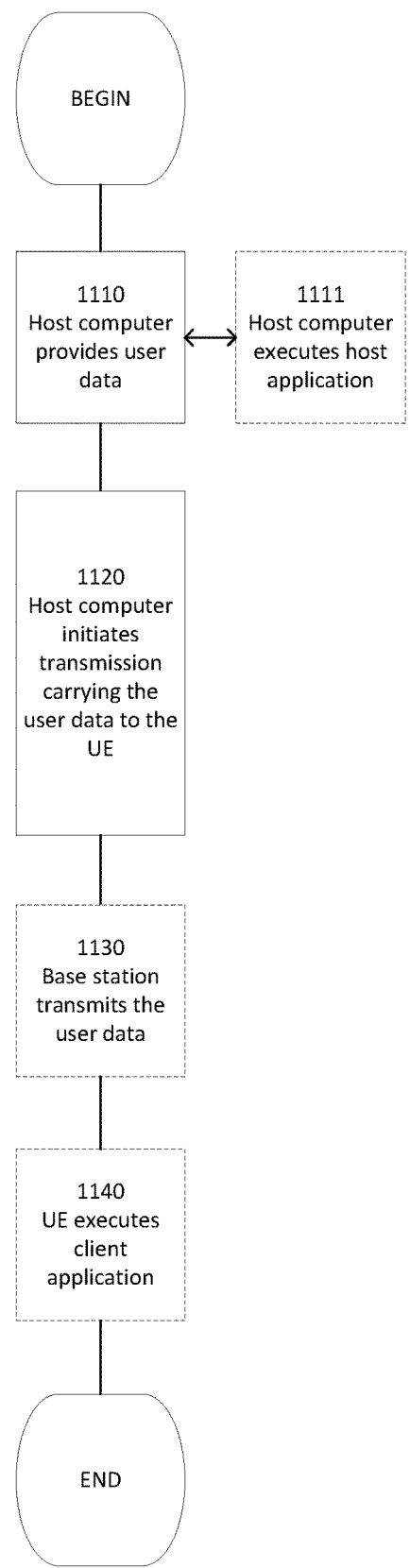
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
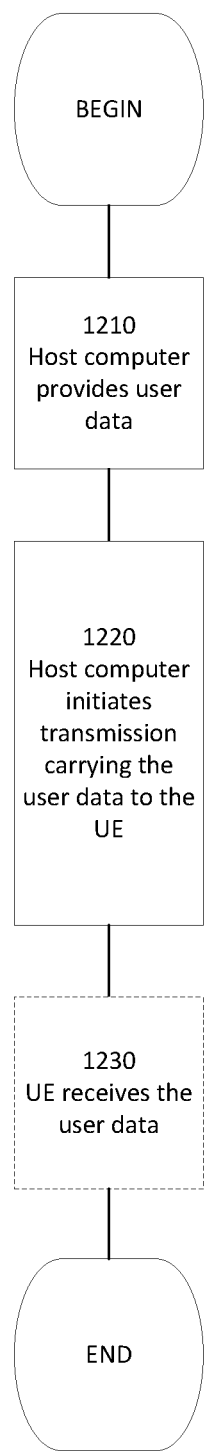
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
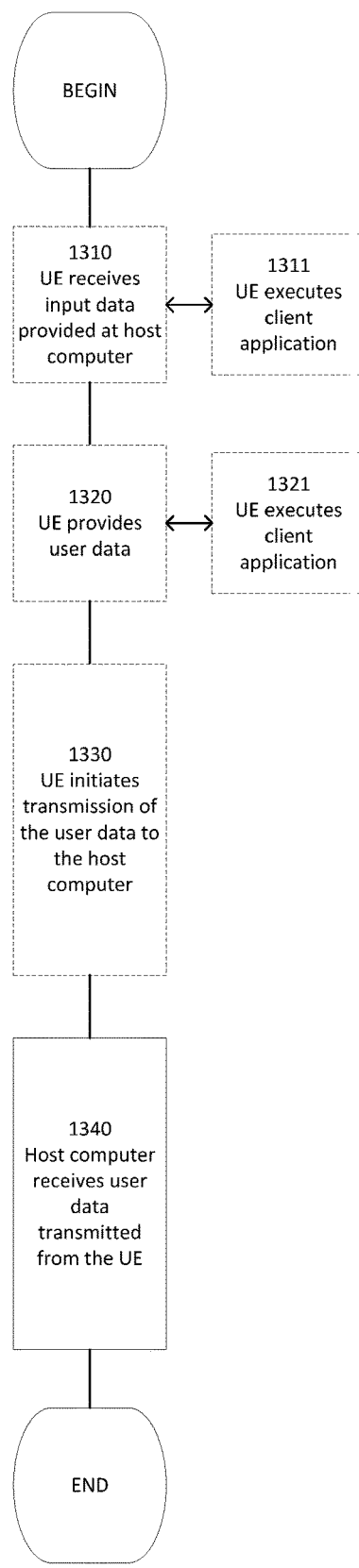
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
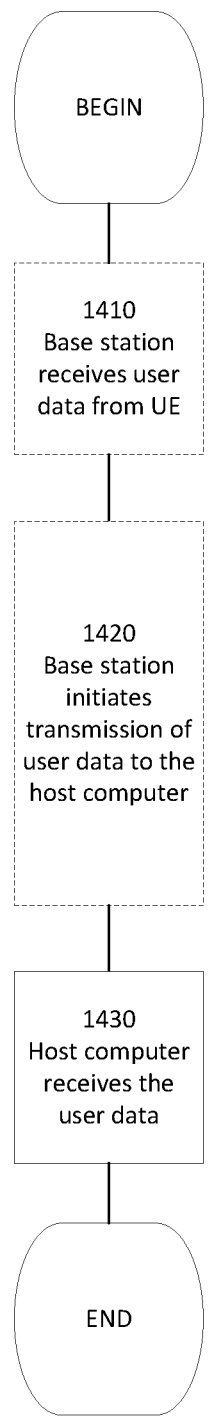
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a first network node, the method comprising:
    determining, at a radio layer, a group header of a device group which comprises at least a terminal device, the group header comprising at least one of:
        an application layer group header being responsible for management of the device group at an application layer; and
        a radio layer group header being responsible for management of the device group at the radio layer;
    assigning a higher priority for communications with the group header of the device group than communications with other devices; and
    the first network node being a radio access network node and the radio access node being a base station.

2. The method of claim 1, wherein the determination of the group header of the device group comprises:
    obtaining identification information of the application layer group header from at least one of a second network node and the terminal device of the device group; and
    determining the radio layer group header of the device group, based at least in part on the identification information of the application layer group header.

3. The method of claim 1, wherein the radio layer group header is the same as the application layer group header.

4. The method of claim 1, wherein the determination of the group header of the device group comprises:
    appointing the terminal device as the radio layer group header of the device group, according to one or more predefined appointment criteria, wherein the appointment of the terminal device as the radio layer group header of the device group is performed by the first network node, in response to a message from the terminal device triggered by one or more predefined events occurring at the terminal device.

5. The method of claim 4, wherein the message triggered by the one or more predefined events indicates that the terminal device requests to become the radio layer group header or indicates that the terminal device appoints itself as the radio layer group header.

6. The method of claim 4, further comprising:
    informing a second network node of at least part of the message triggered by the one or more predefined events; and issuing a response to the message triggered by the one or more predefined events.

7. The method of claim 4, further comprising:
    notifying identification information of the terminal device to other members of the device group, in response that the terminal device is appointed as the radio layer group header of the device group.

8. The method of claim 1, further comprising:
    participating at least partly in an admission control process for a candidate member of the device group via the radio layer group header.

9. A first network node, comprising:
    one or more processors; and
    one or more memories comprising computer program codes, the one or more memories and the computer program codes configured to, with the one or more processors:
        cause the first network node to determine, at a radio layer, a group header of a device group which comprises at least a terminal device, the group header comprising at least one of:
            an application layer group header being responsible for management of the device group at an application layer; and
            a radio layer group header being responsible for management of the device group at the radio layer;
        assign a higher priority for communications with the group header of the device group than communications with other devices; and
    the first network node being a radio access network node and the radio access node being a base station.

* * * * *